United States Patent
Yamada

(10) Patent No.: US 6,222,685 B1
(45) Date of Patent: Apr. 24, 2001

(54) IMAGING LENS

(75) Inventor: Hiroshi Yamada, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/407,090

(22) Filed: Sep. 28, 1999

(30) Foreign Application Priority Data

Sep. 30, 1998 (JP) .................................................. 10-276318

(51) Int. Cl.⁷ .............................. G02B 9/60; G02B 13/18; G02B 13/04
(52) U.S. Cl. ........................ 359/770; 359/714; 359/753; 359/763
(58) Field of Search .................................... 359/714, 717, 359/763, 770, 793, 771, 753, 781, 783

(56) References Cited

U.S. PATENT DOCUMENTS 5,706,141 * 1/1998 Abe ....................................... 359/793
6,057,971 * 6/2000 Mihara ................................. 359/793

FOREIGN PATENT DOCUMENTS 09166748  6/1997 (JP) .
10020188  1/1998 (JP) .

* cited by examiner

Primary Examiner—Scott J. Sugarman
Assistant Examiner—David N. Spector
(74) Attorney, Agent, or Firm—Snider & Associates; Ronald R. Snider

(57) ABSTRACT

An imaging lens comprises a front group constituted by a first lens $L_1$ made of a negative meniscus lens having a convex surface directed onto the object side, the object-side surface thereof being made aspheric, and a second lens $L_2$ made of a biconvex lens having a surface with a larger curvature directed onto the object side; and a rear group constituted by a third lens $L_3$ made of a biconcave lens and two biconvex lenses $L_4$, $L_5$. Letting d be the distance from the object-side surface of the first lens $L_1$ to the image-side surface of the second lens $L_2$, f be the focal length of the whole lens system, and $n_A$ and $v_A$ be average values of refractive index and Abbe number, respectively, in the two biconvex lenses $L_4$, $L_5$, the imaging lens satisfies $1.0 < d/f < 2.0$, $n_A > 1.76$, and $v_A > 45.0$. Thus, while maintaining a compact configuration constituted by five lenses, the imaging lens allows various kinds of aberration such as chromatic aberration in magnification to become favorable even when applied to a CCD imaging device having a large number of pixels.

6 Claims, 7 Drawing Sheets

EXAMPLE 1

EXAMPLE 3

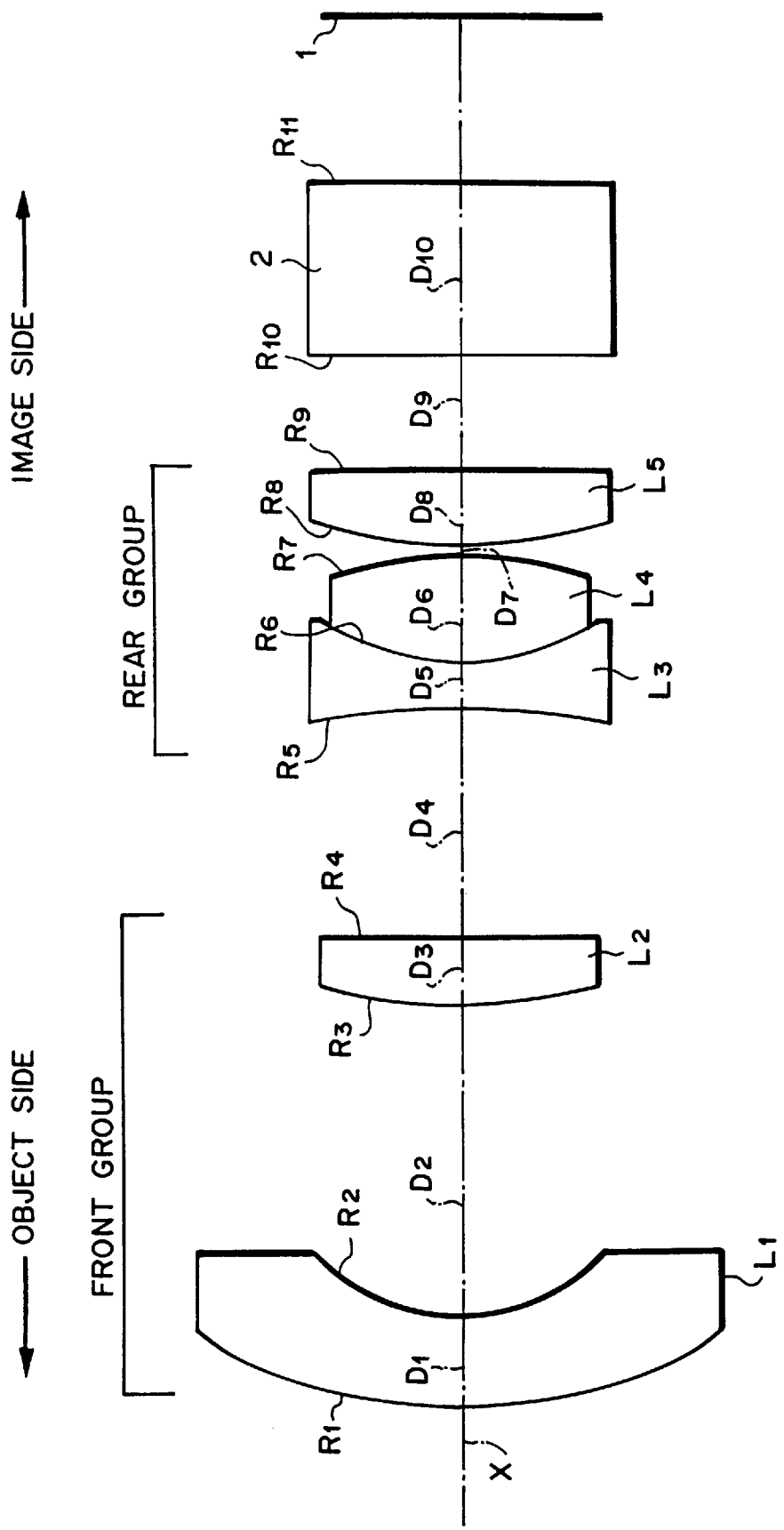

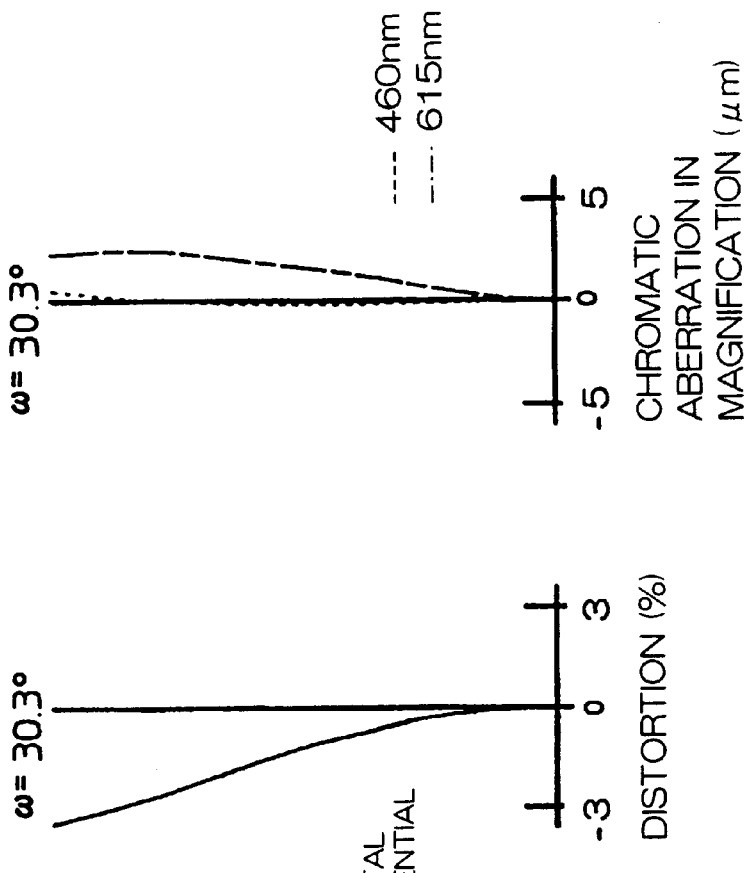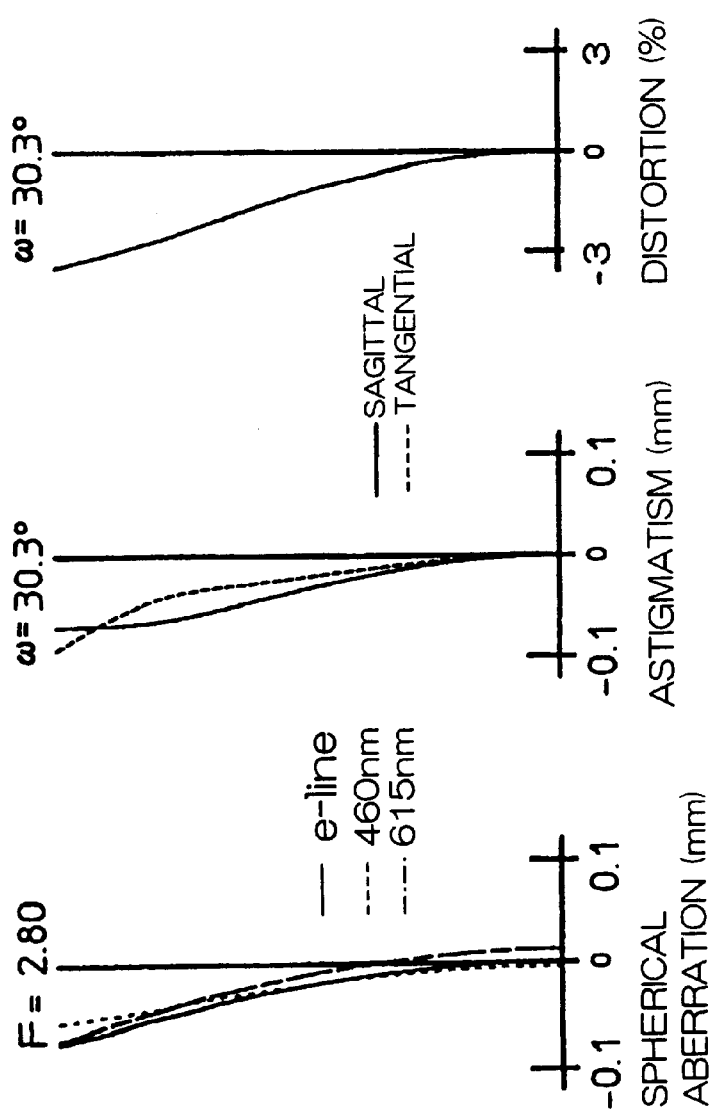

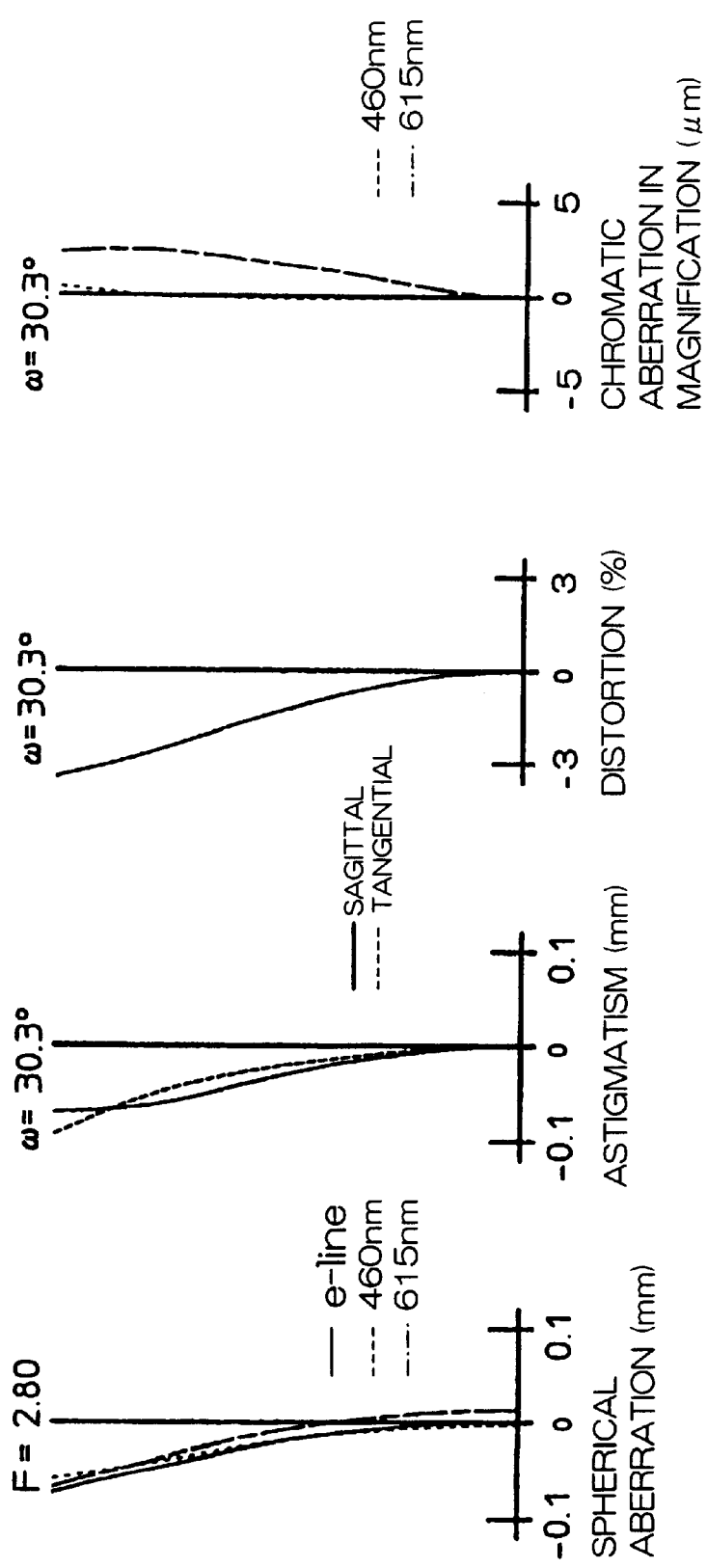

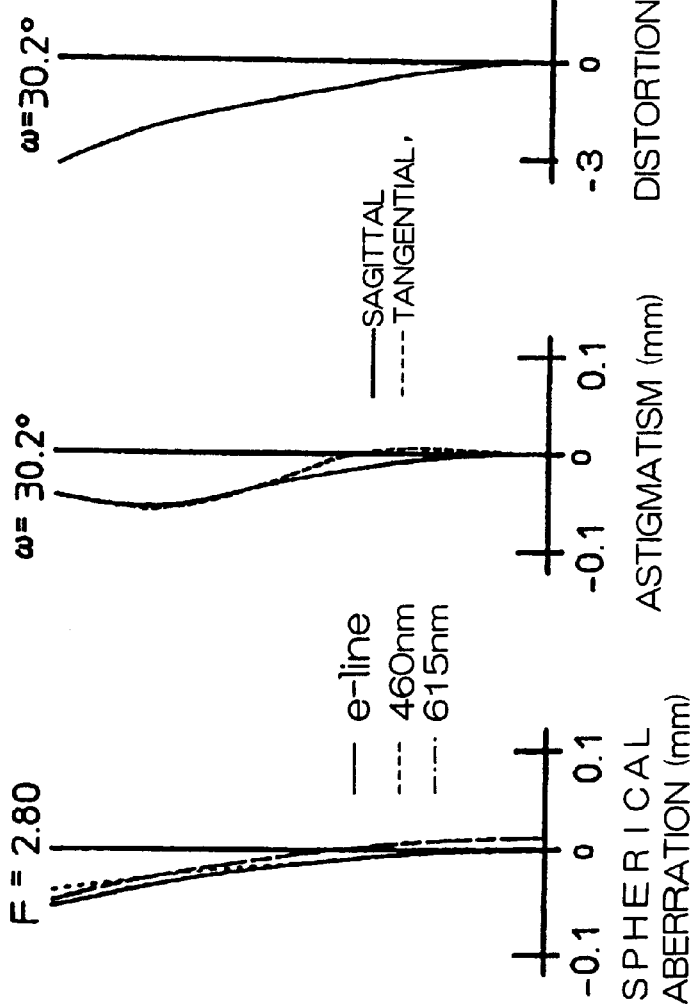
FIG. 6A EXAMPLE 3
FIG. 6B EXAMPLE 3
FIG. 6C EXAMPLE 3
FIG. 6D EXAMPLE 3

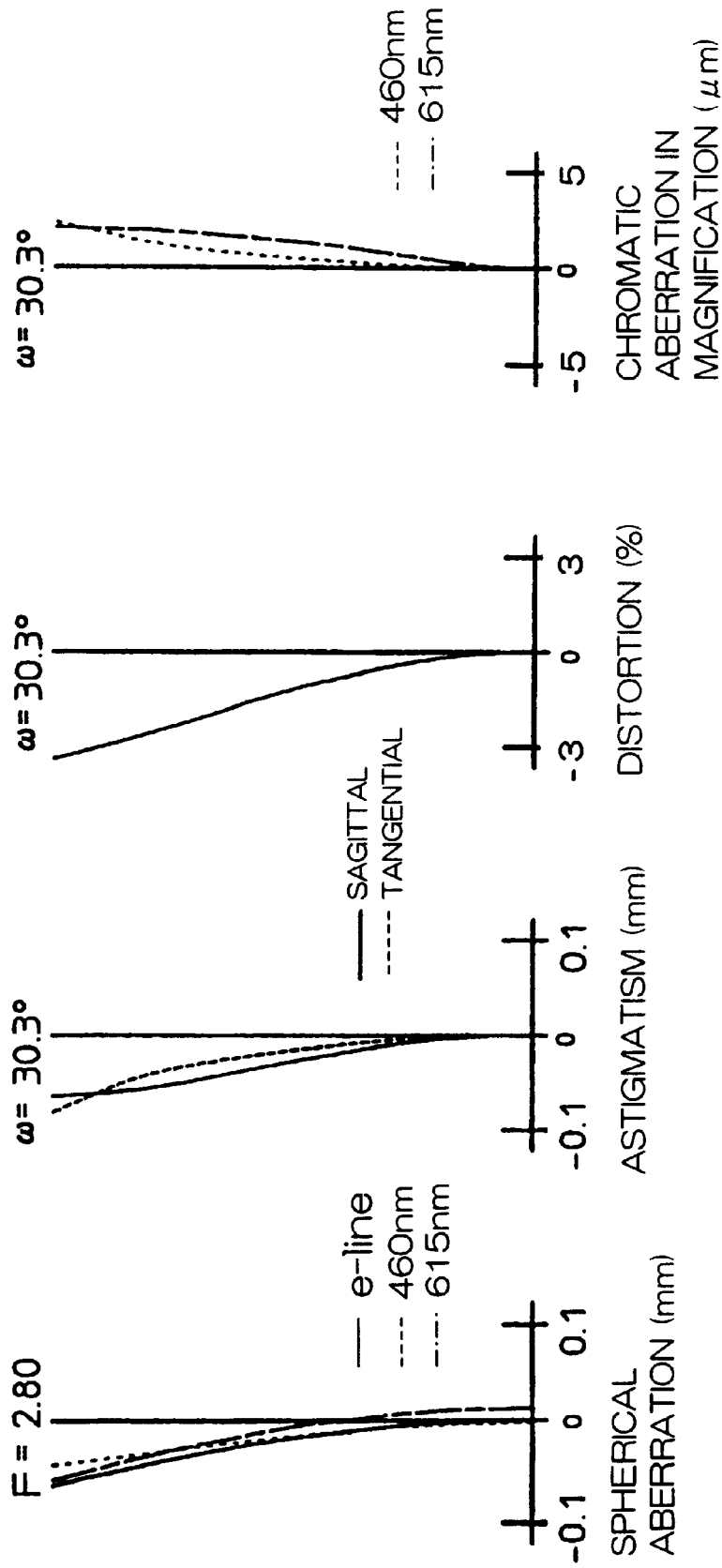

IMAGING LENS

RELATED APPLICATIONS

This application claims the priority of Japanese Patent Application No. 10-276318 filed on Sep. 30, 1998, which is incorporated herein by reference.

BACKGROUND OF THE INVENTION

1. Field of the Invention

The present invention relates, in particular, to an imaging lens employed in an image pickup instrument such as a compact electronic still camera or the like. More specifically, the present invention relates to an imaging lens which can also match an imaging device having a large number of pixels such as CCD.

2. Description of the Prior Art

In recent years, electronic still cameras with which pictures are easier to take and view than with conventional cameras using silver halide films have rapidly been coming into widespread use.

There have been strong demands for imaging lenses used in this kind of electronic still cameras to be of a high resolution, high performances, a small size, and a low cost. In addition, in the electronic still camera using a CCD imaging device, the imaging lens is required to be telecentric.

As an imaging lens satisfying such a requirement, a two-group, five-element configuration disclosed in Japanese Unexamined Patent Publication No. 10-20188 has been known.

Meanwhile, the recent development of CCD imaging devices is so remarkable that those having 1.5 million pixels have lately come into practice use. Hence, it has been demanded that such a CCD imaging device having a large number of pixels should be mounted to an electronic still camera, so as to yield images with a higher resolution.

When the prior art disclosed in the above-mentioned publication is employed in an instrument with a CCD having such a large number of pixels, its chromatic aberration in magnification would increase in particular, so that inconsistencies in color may occur on a reproduced picture.

SUMMARY OF THE INVENTION

In order to solve such a problem, it is an object of the present invention to provide an imaging lens having a high resolution and a relatively far exit pupil, satisfying demands for a smaller size and a lower cost, and being capable of allowing various kinds of aberration, such as chromatic aberration in magnification in particular, to become favorable even when employed in an instrument with a CCD imaging device having a large number of pixels.

The imaging lens in accordance with the present invention comprises, successively from an object side,
  a front group comprising, successively from the object side, a first lens of a meniscus form having a negative refracting power and at least one aspheric surface, a convex surface thereof being directed onto the object side, and a second lens having a positive refracting power and a surface with a greater curvature directed onto the a object side; and
  a rear group comprising one lens having a negative refracting power and two lenses each having a positive refracting power;
  the imaging lens satisfying the following conditional expression (1):

$$1.0 < d/f < 2.0 \quad (1)$$

where
  d is the distance from the object-side surface of the first lens to the image-side surface of the second lens; and
  f is the focal length of the whole lens system.

Also, the imaging lens preferably satisfies at least one of the following conditional expressions (2) and (3):

$$n_A > 1.76 \quad (2)$$

$$v_A > 45.0 \quad (3)$$

where $n_A$ and $v_A$ are average values of refractive index and Abbe number, respectively, in the two lenses each having a positive refracting power.

The object-side surface of the first lens may be made aspheric. Also, both surfaces of the first lens may be made aspheric.

BRIEF DESCRIPTION OF THE DRAWINGS

FIG. 3 is a schematic view showing the basic lens configuration in accordance with Example 4 of the present invention;

FIGS. 4A to 4D are aberration charts of the lens in accordance with Example 1 (showing spherical aberration, astigmatism, distortion, and chromatic aberration in magnification);

FIGS. 5A to 5D are aberration charts of the lens in accordance with Example 2 (showing spherical aberration, astigmatism, distortion, and chromatic aberration in magnification);

FIGS. 6A to 6D are aberration charts of the lens in accordance with Example 3 (showing spherical aberration, astigmatism, distortion, and chromatic aberration in magnification); and FIGS. 7A to 7D are aberration charts of the lens in accordance with Example 4 (showing spherical aberration, astigmatism, distortion, and chromatic aberration in magnification).

DESCRIPTION OF THE PREFERRED EMBODIMENTS

In the following, the imaging lens in accordance with embodiments of the present invention will be explained specifically with reference to Examples 1 to 4.

EXAMPLE 1

Figure 1:
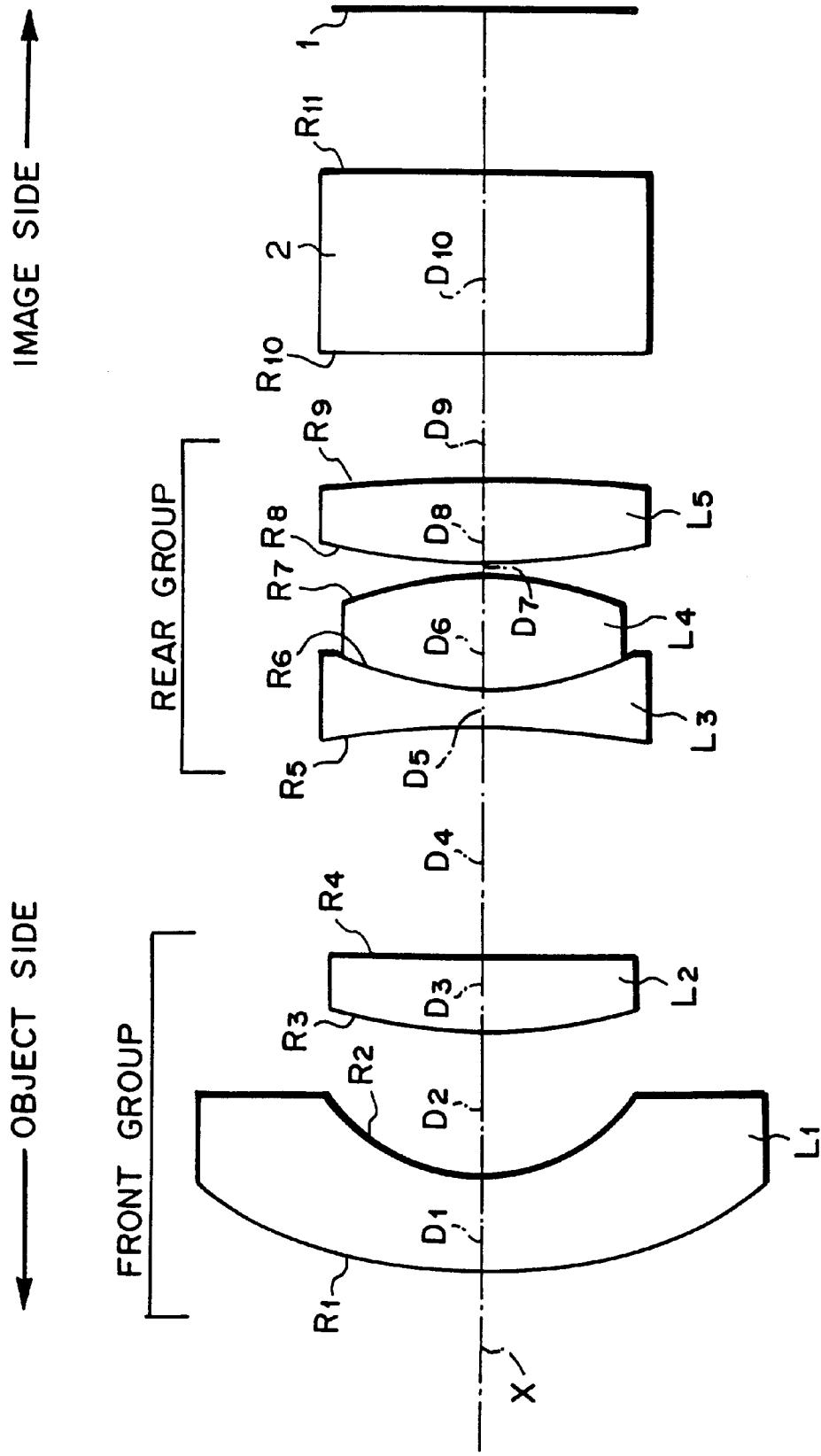
FIG. 1 is a schematic view showing the basic lens configuration in accordance with Example 1 of the present invention.

FIG. 1 shows the basic lens configuration of Example 1. As shown in FIG. 1, the imaging lens in accordance with Example 1 comprises, successively from the object side, a front group comprising, successively from the object side, a first lens $L_1$ of a meniscus form having a negative refracting power, whose convex surface is directed onto the object side, the object-side surface thereof being made aspheric, and a second lens $L_2$ made of a biconvex lens having a surface with a greater curvature directed onto the object side; and a rear group comprising, successively from the object side, a third lens $L_3$ made of a biconcave lens and two biconvex lenses $L_4$, $L_5$. The luminous flux made incident on the imaging lens along its optical axis X from the object side forms an image on an imaging surface (the light-receiving surface of a solid-state imaging device) 1.

Disposed on the image side of the fifth lens $L_5$ is a filter portion 2 including an infrared cutoff filter and a low-pass filter.

In thus constructed imaging lens, the first lens $L_1$ having a negative refracting power is disposed closest to the object, so as to attain a retro-focus type configuration, thereby achieving a wider angle. Further, the object-side surface of the first lens $L_1$ is formed into a predetermined aspheric surface, so as to correct distortion which tends to shift to the minus side.

Also, this imaging lens is configured so as to satisfy the following conditional expressions (1), (2), and (3):

$$1.0 < d/f < 2.0 \quad (1)$$

$$n_A > 1.76 \quad (2)$$

$$v_A > 45.0 \quad (3)$$

where d is the distance from the object-side surface of the first lens $L_1$ to the image-side surface of the second lens $L_2$, f is the focal length of the whole lens system, and $n_A$ and $v_A$ are average values of refractive index and Abbe number, respectively, in the two biconvex lenses $L_4$, $L_5$ constituting the rear group.

When the distance between the first lens $L_1$ and the second lens $L_2$ is set to a predetermined wide gap so as to satisfy the above-mentioned conditional expression (1), the first lens $L_1$ and the second lens $L_2$ can have a smaller power, whereby various kinds of aberration, such as chromatic aberration in magnification in particular, can be corrected effectively. Namely, it becomes difficult to favorably correct various kinds of aberration such as chromatic aberration in magnification if the lower limit of conditional expression (1) is not satisfied, whereas it becomes difficult to attain compactness if the upper limit of conditional expression (1) is exceeded.

Further, the object-side surface of the second lens $L_2$ is formed as a convex surface having a curvature greater than that of the image-side surface thereof, so as to elongate the distance to the front-side focal position of the second lens $L_2$, thereby making it easier to attain a value within the range of conditional expression (1), whereas the convex power of the second lens $L_2$ is made smaller so as to suppress various kinds of aberration to low levels.

Also, when the above-mentioned conditional expression (2) is satisfied, various kinds of aberration such as spherical aberration, coma, curvature of field, and the like can be corrected favorably. When the above-mentioned conditional expression (3) is satisfied, on the other hand, axial chromatic aberration can be corrected favorably.

The upper part of the following Table 1 shows the radius of curvature R (mm) of each lens surface, center thickness of each lens and air space between neighboring lenses D (mm), refractive index N of each lens at d-line, and Abbe number ν of each lens in Example 1.

In Table 1 and Tables 3, 5, and 7 which will be described later, the numbers referring to the letters R, D, N, and ν increase successively from the object side. Here, the surface indicated by "*" is an aspheric surface, which is represented by the following aspheric surface expression.
Aspheric surface expression:

$$X = (y^2/r) / \{1 + [1 - K(y/r)^2]^{1/2}\} + \Sigma A_{2i} Y^{2i}$$

where
- X is the length of the perpendicular to the tangential plane of an apex of the aspheric surface from a point on the aspheric surface at a height y from the optical axis;
- y is the height from the optical axis;
- r is the radius of curvature near the apex of the aspheric surface;
- K is the cone coefficient; and
- $A_{2i}$ is the aspheric surface coefficient of the 2i-th order (i being an integer from 2 to 5).

Table 2 (follows) shows the coefficients concerning the above-mentioned aspheric surface.

Further, the focal length f of the whole lens system is 6.19 mm as indicated in the lower part of Table 1, the F number is 2.80, the half angle of view ω is 30.3 degrees, and the value of d/f is 1.18. Hence, all of the above-mentioned conditional expressions (1), (2), and (3) are satisfied.

EXAMPLE 2

The imaging lens in accordance with Example 2 has a configuration substantially similar to that of the imaging lens in accordance with Example 1 shown in FIG. 1, thereby yielding similar effects, except that the second lens $L_2$ is a positive meniscus lens.

The upper part of the following Table 3 shows the radius of curvature R (mm) of each lens surface, center thickness of each lens and air space between neighboring lenses D (mm), refractive index N of each lens at d-line, and Abbe number ν of each lens in Example 2. Here, the surface indicated by "*" is an aspheric surface, which is represented by the above-mentioned aspheric surface expression.

Table 4 (follows) shows the coefficients concerning the above-mentioned aspheric surface.

Further, the focal length f of the whole lens system is 6.19 mm as indicated in the lower part of Table 3, the F number is 2.80, the half angle of view ω is 30.3 degrees, and the value of d/f is 1.42. Hence, all of the above-mentioned conditional expressions (1), (2), and (3) are satisfied.

EXAMPLE 3

Figure 2:
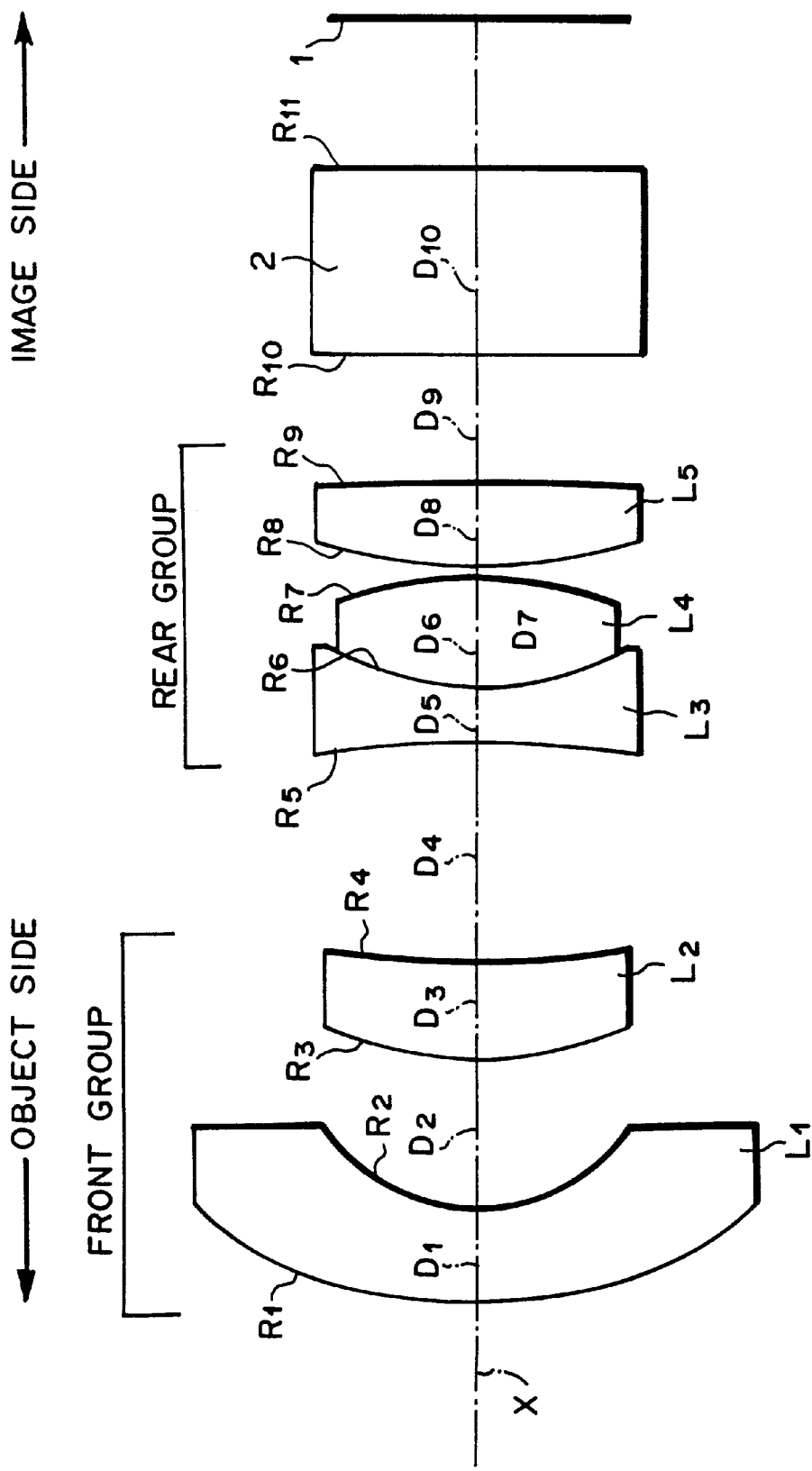
FIG. 2 is a schematic view showing the basic lens configuration in accordance with Example 3 of the present invention.

As shown in FIG. 2, the imaging lens in accordance with Example 3 has a configuration substantially similar to that of the imaging lens in accordance with Example 2, thereby yielding similar effects, except that not only the object-side surface but also the image-side surface of the second lens $L_2$ is made aspheric.

The upper part of the following Table 5 shows the radius of curvature R (mm) of each lens surface, center thickness of each lens and air space between neighboring lenses D (mm), refractive index N of each lens at d-line, and Abbe number ν of each lens in Example 3. Here, each surface indicated by "*" is an aspheric surface, which is represented by the above-mentioned aspheric surface expression.

Table 6 (follows) shows the coefficients concerning the above-mentioned aspheric surfaces.

Further, the focal length f of the whole lens system is 6.19 mm as indicated in the lower part of Table 5, the F number is 2.80, the half angle of view ω is 30.2 degrees, and the value of d/f is 1.29. Hence, all of the above-mentioned conditional expressions (1), (2), and (3) are satisfied.

EXAMPLE 4

As shown in FIG. 3, the imaging lens in accordance with Example 4 has a configuration substantially similar to that of the imaging lens in accordance with Example 1, thereby yielding similar effects.

The upper part of the following Table 7 shows the radius of curvature R (mm) of each lens surface, center thickness of each lens and air space between neighboring lenses D (mm), refractive index N of each lens at d-line, and Abbe number ν of each lens in Example 4. Here, the surface indicated by "*" is an aspheric surface, which is represented by the above-mentioned aspheric surface expression.

Table 8 (follows) shows the coefficients concerning the above-mentioned aspheric surface.

Further, the focal length f of the whole lens system is 6.19 mm as indicated in the lower part of Table 7, the F number is 2.80, the half angle of view ω is 30.3 degrees, and the value of d/f is 1.94. Hence, all of the above-mentioned conditional expressions (1), (2), and (3) are satisfied.

FIGS. 4, 5, 6, and 7 show various kinds of aberration (spherical aberration, astigmatism, distortion, and chromatic aberration in magnification) in Examples 1, 2, 3, and 4, respectively. In these aberration charts, ω indicates the half angle of view. As can be seen from these charts, various kinds of aberration including chromatic aberration in magnification can be made favorable in accordance with the embodiments of the present invention.

Here, a cover glass can also be inserted, together with the low-pass filter and infrared cutoff filter, between the imaging lens and the imaging surface (the light-receiving surface of the solid-state imaging device) 1.

In the imaging lens in accordance with the present invention, as explained in the foregoing, the gap between the first and second lenses constituting the front group is set to a predetermined wide distance, and the object-side surface of the second lens is formed as a surface having a large curvature, whereby, while in a compact configuration made of five lenses, various kinds of aberration such as chromatic aberration in magnification can be made favorable, and good reproduced images which are free of problems such as inconsistencies in color and the like can be obtained even when the imaging lens is employed in an image pickup instrument mounted with a CCD imaging device having a large number of pixels.

TABLE 1

Example 1

| Surface | R | D | $N_d$ | $v_d$ |
|---|---|---|---|---|
| 1* | 16.8252 | 2.25011 | 1.71300 | 53.9 |
| 2 | 4.2007 | 3.30000 | | |
| 3 | 12.3876 | 1.78230 | 1.84666 | 23.8 |
| 4 | −499.8480 | 5.51732 | | |
| 5 | −21.5487 | 0.91253 | 1.84666 | 23.8 |
| 6 | 7.0933 | 2.80444 | 1.69680 | 55.5 |
| 7 | −7.9424 | 0.20161 | | |
| 8 | 15.1686 | 2.00543 | 1.83500 | 43.0 |
| 9 | −42.4969 | 3.00000 | | |
| 10 | ∞ | 4.32800 | 1.51633 | 64.1 |
| 11 | ∞ | | | | f = 6.19
d/f = 1.18

TABLE 2

Example 1
First Surface

| K | = | 1.0000000 | |
| $A_4$ | = | 0.3124700 | $\times 10^{-3}$ |
| $A_6$ | = | −0.3557808 | $\times 10^{-6}$ |

TABLE 2-continued

Example 1
First Surface

| $A_8$ | = | 0.4936034 | $\times 10^{-7}$ |
| $A_{10}$ | = | 0.1923878 | $\times 10^{-9}$ |

TABLE 3

Example 2

| Surface | R | D | $N_d$ | $v_d$ |
|---|---|---|---|---|
| 1* | 15.9048 | 2.04477 | 1.72000 | 50.3 |
| 2 | 4.3923 | 5.00000 | | |
| 3 | 11.5649 | 1.75069 | 1.84666 | 23.8 |
| 4 | 78.3111 | 5.93685 | | |
| 5 | −38.0331 | 0.91204 | 1.84666 | 23.8 |
| 6 | 6.5164 | 2.79182 | 1.71300 | 53.9 |
| 7 | −10.0014 | 0.20012 | | |
| 8 | 14.1156 | 1.98059 | 1.83500 | 43.0 |
| 9 | −74.8459 | 3.00000 | | |
| 10 | ∞ | 4.32800 | 1.51633 | 64.1 |
| 11 | ∞ | | | | f = 6.19
d/f = 1.42

TABLE 4

Example 2
First Surface

| K | = | 1.0000000 | |
| $A_4$ | = | 0.2874452 | $\times 10^{-3}$ |
| $A_6$ | = | 0.3831024 | $\times 10^{-6}$ |
| $A_8$ | = | 0.3341652 | $\times 10^{-7}$ |
| $A_{10}$ | = | 0.1626714 | $\times 10^{-9}$ |

TABLE 5

Example 3

| Surface | R | D | $N_d$ | $v_d$ |
|---|---|---|---|---|
| 1* | 16.3581 | 2.21428 | 1.71300 | 53.9 |
| 2* | 4.4127 | 3.50000 | | |
| 3 | 8.5350 | 2.28690 | 1.84666 | 23.8 |
| 4 | 21.4017 | 5.34537 | | |
| 5 | −24.7490 | 1.32603 | 1.84666 | 23.8 |
| 6 | 6.9491 | 2.74343 | 1.69680 | 55.5 |
| 7 | −8.4993 | 0.20001 | | |
| 8 | 11.7674 | 2.07174 | 1.83500 | 43.0 |
| 9 | −85.0060 | 3.00000 | | |
| 10 | ∞ | 4.32800 | 1.51633 | 64.1 |
| 11 | ∞ | | | | f = 6.19
d/f = 1.29

TABLE 6

Example 3

| | First surface | | | Second surface | |
|---|---|---|---|---|---|
| K | = | 1.0000000 | K | = | 1.0000000 |
| $A_4$ | = | 0.8638107 $\times 10^{-3}$ | $A_4$ | = | 0.1276096 $\times 10^{-2}$ |
| $A_6$ | = | −0.1227603 $\times 10^{-4}$ | $A_6$ | = | 0.6582005 $\times 10^{-5}$ |
| $A_8$ | = | 0.1150956 $\times 10^{-6}$ | $A_8$ | = | −0.1394860 $\times 10^{-8}$ |
| $A_{10}$ | = | 0.3479994 $\times 10^{-9}$ | $A_{10}$ | = | −0.5924202 $\times 10^{-11}$ |

TABLE 7

Example 4

| Surface | R | D | $N_d$ | $v_d$ |
|---|---|---|---|---|
| 1* | 15.0393 | 2.25000 | 1.83500 | 43.0 |
| 2 | 5.0265 | 8.00000 | | |
| 3 | 13.0974 | 1.78234 | 1.84666 | 23.8 |
| 4 | −1141.4483 | 5.83976 | | |
| 5 | −21.5516 | 1.17816 | 1.84666 | 23.8 |
| 6 | 6.0387 | 2.83105 | 1.72000 | 50.3 |
| 7 | −10.5416 | 0.20000 | | |
| 8 | 12.1764 | 1.98064 | 1.83500 | 43.0 |
| 9 | −12315.2709 | 3.00000 | | |
| 10 | ∞ | 4.32800 | 1.51633 | 64.1 |
| 11 | ∞ | | | | f = 6.19
d/f = 1.94

TABLE 8

Example 4
First Surface

| | | |
|---|---|---|
| K | = | 1.0000000 |
| $A_4$ | = | $0.1592999 \times 10^{-3}$ |
| $A_6$ | = | $0.6717857 \times 10^{-6}$ |
| $A_8$ | = | $0.6871770 \times 10^{-8}$ |
| $A_{10}$ | = | $0.1673892 \times 10^{-9}$ |

What is claimed is:

1. An imaging lens comprising, successively from an object side, a front group comprising, successively from the object side, a first lens of a meniscus form having a negative refracting power and at least one aspheric surface, a convex surface thereof being directed onto the object side, and a second lens having a positive refracting power and a surface with a greater curvature directed onto the object side; and a rear group comprising one lens having a negative refracting power and two lenses each having a positive refracting power;

said imaging lens satisfying the following conditional expression (1):

$$1.0 < d/f < 2.0 \quad (1)$$

where d is the distance from the object-side surface of the first lens to the image-side surface of the second lens; and f is the focal length of the whole lens system.

2. An imaging lens according to claim 1, further satisfying the following conditional expression (2):

$$n_A > 1.76 \quad (2)$$

where $n_A$ is an average value of refractive index in said two lenses each having a positive refracting power.

3. An imaging lens according to claim 1, further satisfying the following conditional expression (3):

$$v_A > 45.0 \quad (3)$$

where $v_A$ is an average value of Abbe number in said two lenses each having a positive refracting power.

4. An imaging lens according to claim 1, further satisfying the following conditional expressions (2) and (3):

$$n_A > 1.76 \quad (2)$$

$$v_A > 45.0 \quad (3)$$

where $n_A$ and $v_A$ are average values of refractive index and Abbe number, respectively, in said two lenses each having a positive refracting power.

5. An imaging lens according to claim 1, wherein the object-side surface of said first lens is made aspheric.

6. An imaging lens according to claim 1, wherein both surfaces of said first lens are made aspheric.

* * * * *